June 11, 1929.  J. LENTINI  1,717,234
PROTECTION OF FILMS AGAINST FIRE
Filed Oct. 28, 1927  2 Sheets-Sheet 1

Inventor
Joseph Lentini
by Wilkinson & Giusta
Attorneys.

June 11, 1929.  J. LENTINI  1,717,234
PROTECTION OF FILMS AGAINST FIRE
Filed Oct. 28, 1927  2 Sheets-Sheet 2
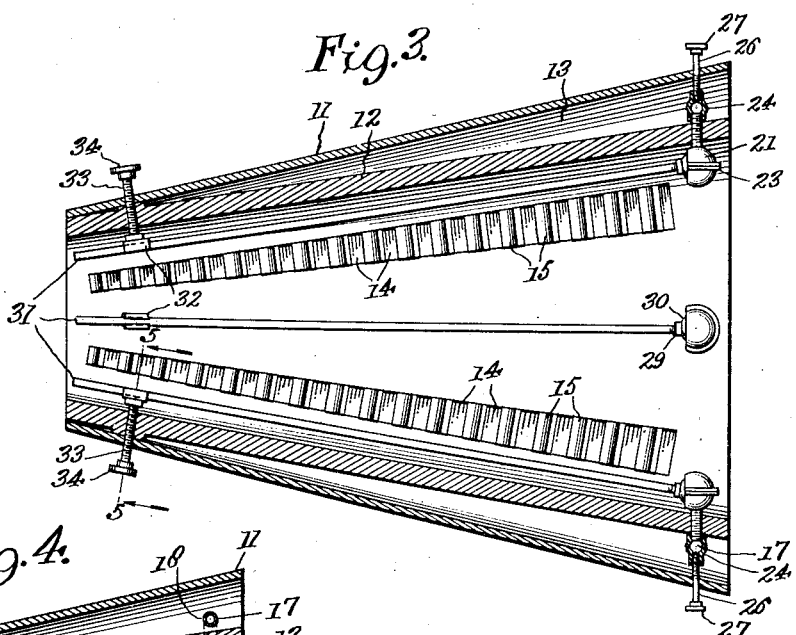
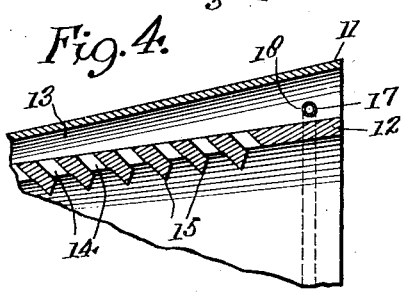
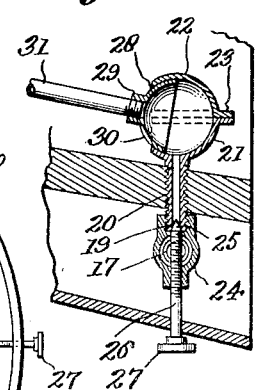
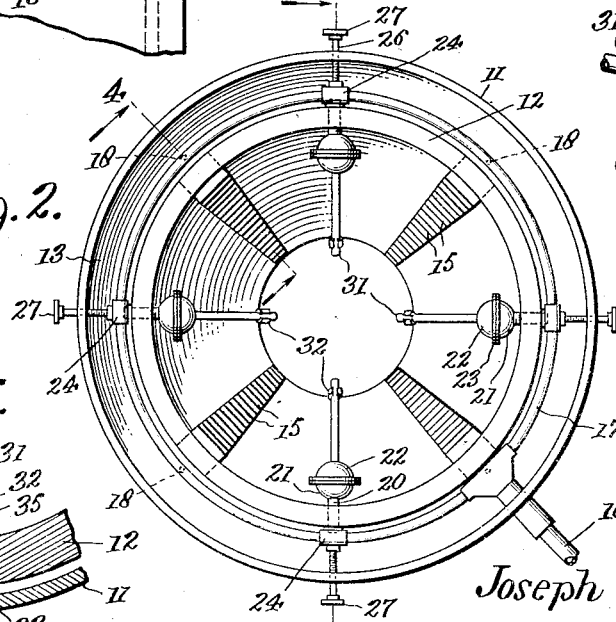
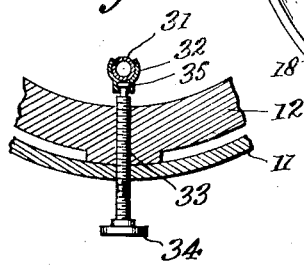
Inventor
Joseph Lentini
by Wilkinson & Giusta
Attorneys.

Patented June 11, 1929.

1,717,234

UNITED STATES PATENT OFFICE.

JOSEPH LENTINI, OF KENNER, LOUISIANA.

PROTECTION OF FILMS AGAINST FIRE.

Application filed October 28, 1927. Serial No. 229,492.

The present invention relates to improvements in devices for the protection of films against fire, and has for an object to provide against the fire hazard encountered in motion picture machines in which celluloid, inflammable film is apt to catch fire if arrested for too long an interval before the extremely strong light from the lamp house.

This fire hazard is particularly dangerous in motion picture houses where large crowds congregate and has been the source of constant danger.

The invention has for another object to provide a device capable of installation in standard motion picture apparatus without involving any deviation from the standard practice which will eliminate this danger from fire hazard in a simple and inexpensive manner.

With the foregoing and other objects in view, the invention will be described in detail hereinafter and will be more fully pointed out in the appended claims.

In the drawings in which like parts are designated by like symbols throughout the several views, Figure 1 is a diagrammatic view of a motion picture camera in which the improved device is incorporated with the jets of air indicated by the arrows.

Figure 2 is an enlarged end view of the modified projector 2.

Figure 3 is a longitudinal section taken on the line 3—3 in Figure 2.

Figure 4 is a fragmentary longitudinal section taken on the line 4—4 also in Figure 2.

Figure 5 is a fragmentary cross section taken on a further enlarged scale on the line 5—5 in Figure 3, and, Figure 6 is a further enlarged section showing the pipe and universal joint connection.

Figure 1:
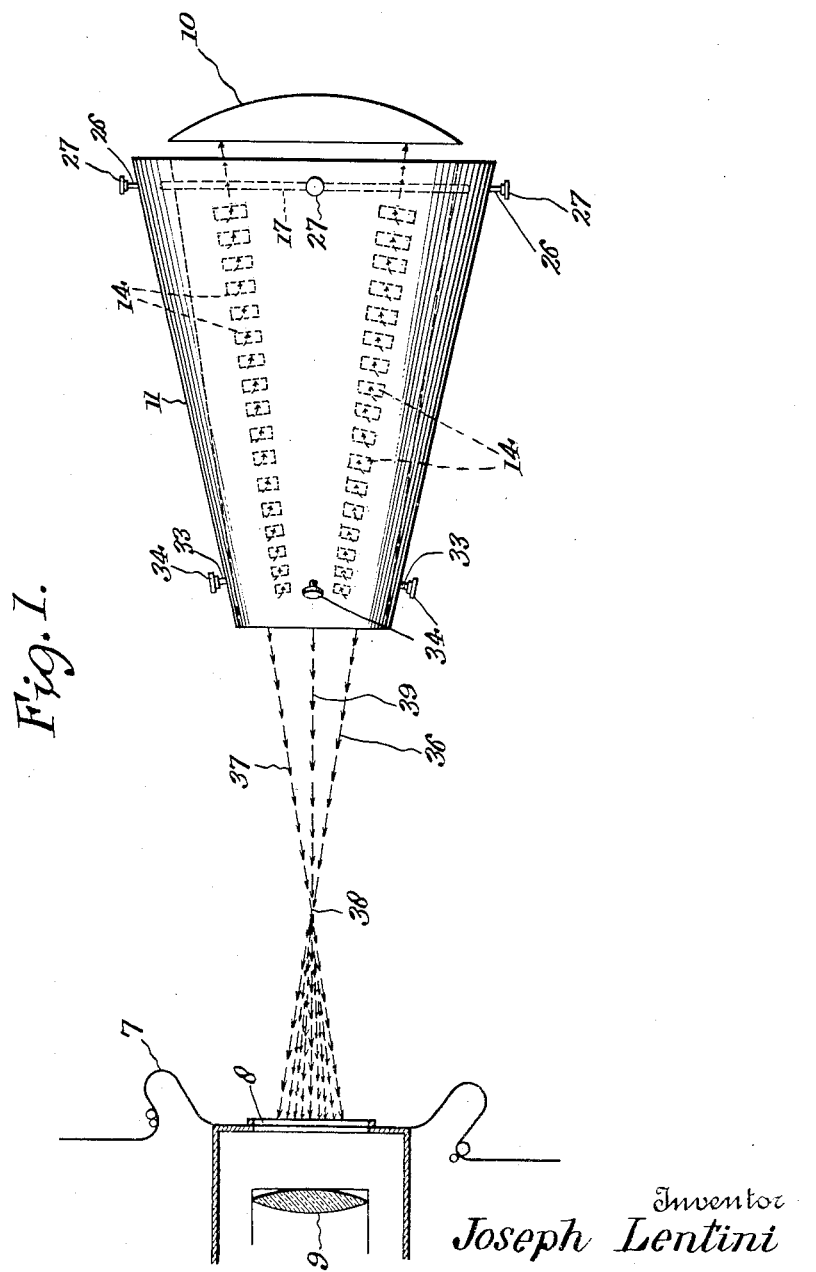

Referring more particularly to the drawings, in Figure 1, 7 designates the motion picture film or strip which is moved in the customary manner, intermittently past the projection orifice 8. The projecting lens is indicated at 9 and the condensing lens at 10, this latter lens being mounted in the usual lamp house (not shown). The rays of light from the light source in the lamp house are directed through the condenser lens or lenses 10 and through the projection tube shown at 11 on to that part of the film 7 which appears in the aperture 8, and the image on the film is projected by means of projecting lenses 9 on the screen in the usual manner.

In accordance with the present invention, the projection tube 11 is modified to contain means whereby jets of cooling air may be directed against the film strip or that part of the film strip which appears at the time in the orifice 8 and subjected to the intensity of the condensed light rays. The device further provides for the circulation of drafts or jets of air through the projection tube and against the condensing lens 10 whereby to further cool and maintain these parts at relatively low temperature.

Within the projector tube 11 is mounted a second tube 12 of frusto-conical form in which the outer or smaller end is of a diameter to fit snugly within the outer end of the projector tube 11, the two tubes forming a tight joint at this point to avoid leakage of air, which, as hereinafter described, is supplied to the intermediate chamber 13 formed between the two tubes 11 and 12. The meeting or contacting ends of the tubes may be secured together if desired by any appropriate means. The larger or inner end of the inner tube 12 is of a diameter appreciably smaller than the diameter of the larger end of the outer projector tube 11. As a consequence the inner tube 12 diverges away from the outer tube 11 from the smaller toward the larger ends of the tubes and chamber 13, of a graduated cross section, is formed. This particular formation is useful in that the outer tube wall 11 constitutes a reflecting wall for directing the currents of air in the chamber 13 toward and into the inclined ports 14 made in the inner tube 12. These inclined ports are preferably arranged in rows, four such rows being shown. The rows extend in a line parallel with the axis of the tube and, as shown in Figure 2, are arranged at approximately 90° apart. The inclination given the ports 14 is such as to direct the currents or drafts of air issuing from the air chamber 13 into the interior of the inner tube 12 toward the large end of the tube and toward the condensing lens 10. I also prefer to form within the tube projections 15 between the ports 14 for the purpose of increasing the area of the ports at their lower sides and consequently to more effectively direct the currents of air in a rearward direction.

The air is introduced into the device in any appropriate manner, as through a connecting pipe 16, shown in Figure 2, from a source preferably of compressed air or from a fan or blower or the like. The supply pipe 16 is adapted to convey the air to an annular distributing pipe 17 which is located in the chamber 13 at or near the larger end thereof. In the distributing pipe 17 are provided at suitable intervals orifices 18 positioned to direct the air at high velocity in minute jets longitudinally into and through the chamber 13 originating at the larger cross section of the chamber and proceeding to progressively smaller parts thereof. This is guided in its movement along the chamber 13 to the ports 14 as heretofore stated.

The distributing pipe 17 is provided at suitable intervals with unions 24 having threaded sockets 19 to receive the threaded stems 20 of the inner socket members 21 of universal joints, the outer socket members of which are indicated at 22, the two members being removably united at the flanges 23 in a well-known manner. In the outer ends of the stems 20, are made valve seats 25 for receiving thereagainst the ends of threaded needle valves 26 which extend through and project upon the exterior of the outer tube 11 whereby they may be easily manipulated through the handles 27.

The universal joints comprise further the swivel heads 28 which are movably mounted within the socket members 21, 22. Socketed projections on the head 28 extend out through the openings 30 in the socket members 21 and 22 and removably receive therein the threaded ends of the pipes or tubes 31. These tubes may be in any number, four such tubes being shown as extending about within the inner tube 12 at approximately 90° apart and being located substantially midway between the rows of the ports 14. The pipes 31 are of small diameter and of great length extending substantially the entire length of the projector tube. The discharge ends of the pipes 31 are disposed close to the smaller end of the two tubes and are arranged to direct the jets of air upon the film as shown by the arrows in Figure 1. The delivery ends of the jet pipes 31 are supported in clamps 32, shown to advantage in Figure 5, the clamps being carried upon the ends of screw rods 33 fitted through the tubes 11 and 12 and having external handles 34 for manipulating from without. By rotating the screw shafts 33 in one or the other directions, the jets may be directed to any particular localized area on the film strip. The screw rods 33 have a swivel connection at 35 with the clamps 32 which embrace the air jet pipes 31.

As shown in Figure 2, the orifices 18 in the distributing pipe 17 are preferably disposed in line with the rows of the ports 14.

In the operation of the device, the pipe 16 may be connected with a constant supply of air, preferably under pressure. A head of air is thus maintained in the annular distributing pipe 17 and such air escapes through the orifices 18 and ports 14, it being deflected thereby rearwardly in the inner tube 12 and against the condensing lens 10. The expansion of the compressed air augments the cooling effect.

The air in the distributing pipe 17 is also let into such of the air jet pipes 31 under the control of the valves 26, these valves also regulating the quantity of the air which is admitted to any one pipe 31. The hollow universal joint permits of the movement of the jet pipes 31 without in any way interfering with the flow of air therethrough.

I have found that the use of four of these jet pipes is very important and contributes very effectively to the cooling of the film below a point where the fire hazard is in any way dangerous. The arrangement of the pipes 31 is also important as the delivery ends of these pipes are brought sufficiently close together to secure a crossing of the jets of air between the projector tube 11 and the film in the film gate 8. Referring to Figure 1, the line of arrows 36 shows the air jet from the lower pipe 31 as striking the upper central portion of the film in the film orifice 8; while the line of arrows 37 shows the jet of air from the upper jet pipe 31 as crossing the jet 36 at an intermediate point 38 and impinging upon the lower central portion of the film in the orifice 8. The line of arrows 39 shows the jet of air from one of the side jets crossing the other three jets at the same point 38 and striking upon the opposite side of the film exposure 8.

The jet of air from the opposite side jet crosses in like manner and strikes the opposite side of the exposed portion of the film.

The various jets meeting centrally at the point 38 will react on one another and cause the diffusion of the air jets which will spread entirely over all parts of the film surface exposed in the opening 8, and, by virtue of bringing these film jets centrally at the point 38, they will interpose a cooling medium between the light source and the inflammable film 7 so that the air acts not only to cool the film by physical contact thereon, but it also interposes a resistance to the heat in the rays from attacking the film, although not interfering with the sufficiently strong passage of the light to properly project the pictures upon the screen and, in no wise is the visibility of the pictures on the screen impaired.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. In a motion picture apparatus, a holder for a cooling fluid, jet pipes connecting with said holder and extending generally along the axis of the light beam from the lamp-house to the film in the exposure opening for directing the cooling fluid against the film, and means for adjusting said jet pipes to regulate the angle of incidence of the jets upon the film strip.

2. In a motion picture projection machine, a conduit for cooling fluid, adjustable jet pipes connecting with said conduit, means for adjustably supporting said jet pipes to cause the jets of fluid issuing therefrom to cross one another in front of the film strip in the exposure opening.

3. In a motion picture machine, an annular conduit for cooling fluid, adjustable jet pipes connecting with said conduit and adapted to direct the jets of the cooling fluid in intersecting lines to the film in the exposure opening, and means for regulating the flow of the fluid from said conduit to the jet pipes.

4. In a motion picture machine, an annular conduit in communication with a source of cooling fluid supply, a plurality of jet pipes adjustably connected to said conduit extending generally along the axis of the light beam from the lamp house to the film in the exposure opening for directing the cooling fluid against the film, means to individually regulate the supply of cooling fluid from the conduit to said jet pipes, and means for adjustably supporting the delivery ends of the jet pipes.

5. In a motion picture projection machine, an annular conduit in communication with a constant source of cooling fluid, elongated jet pipes of small diameter swivelly connected to said conduit extending generally along the axis of the light beam from the lamp house to the film in the exposure opening for directing the cooling fluid against the film, valves in the conduit for independently regulating the passage of the cooling fluid to said jet pipes, and means for adjustably supporting the delivery ends of said jet pipes.

6. In a motion picture projection machine, a projection tube, an inner tube fitted therein and providing a chamber between the tubes in communication with a source of cooling fluid, said inner tube having ports arranged to direct the fluid toward the condensing lens.

7. In a motion picture projection machine, a projection tube, an inner tube therein providing a chamber for receiving cooling fluid and having a plurality of rows of ports, and projections on the undersides of the ports for deflecting the cooling fluid toward and against the condenseing lens.

8. In a motion picture projection machine, a projection tube, a frusto-conical inner tube within the projection tube having a smaller base and providing a tapering annular chamber for receiving cooling fluid, said inner tube having inclined ports to direct the cooling fluid toward and against the condensing lens.

9. In a motion picture projection apparatus, a projection tube, an inner tube therein coupled with the projection tube at its smaller end, and diverging from the projection tube at its larger end to provide a tapering chamber for cooling fluid between the tubes, said inner tube having ports to direct the cooling fluid against the condensing lens, an annular conduit for compressed air in the large end portion of the chamber having orifices to direct the cooling fluid to the chamber, and adjustable jet pipes connecting with the conduit and extending along within the inner tube for directing jets of cooling fluid in intersecting lines to the film in the exposure opening.

JOSEPH LENTINI.